United States Patent [19]
DeMarti, Jr. et al.

[11] Patent Number: 5,576,794
[45] Date of Patent: Nov. 19, 1996

[54] RANDOM BATCH PHOTOFINISHING

[75] Inventors: Jack C. DeMarti, Jr., Rochester; Walter C. Slater, Prattsburg; Joseph P. Kent, Webster, all of N.Y.

[73] Assignee: Eastman Kodak Company, Rochester, N.Y.

[21] Appl. No.: 241,986

[22] Filed: May 12, 1994

[51] Int. Cl.⁶ ................................................ G03D 13/00
[52] U.S. Cl. ........................................ 396/564; 396/620
[58] Field of Search .................................. 354/319, 297, 354/321, 320; 355/40, 41, 77

[56] References Cited

U.S. PATENT DOCUMENTS

| | | | |
|---|---|---|---|
| 3,576,369 | 4/1971 | Wick et al. | 355/77 |
| 3,690,765 | 9/1972 | Rickard et al. | 355/97 |
| 3,768,905 | 10/1973 | Williams | 355/77 |
| 4,039,258 | 8/1977 | Hujer et al. | 355/38 X |
| 4,101,216 | 7/1978 | Grossman | 355/38 X |
| 4,168,120 | 9/1979 | Freier et al. | 355/38 |
| 4,214,310 | 7/1980 | Strune | 364/475 |
| 4,251,156 | 2/1981 | Zimmermann et al. | 355/41 |
| 4,260,244 | 4/1981 | Laska et al. | 355/77 X |
| 4,291,972 | 9/1981 | Laska et al. | 355/40 |
| 4,293,215 | 10/1981 | Rosborough, Jr. et al. | 355/40 |
| 4,294,537 | 10/1981 | Laska et al. | 355/40 X |
| 4,379,632 | 4/1983 | Dedden et al. | 355/41 X |
| 4,432,637 | 2/1984 | Baschung | 355/40 X |
| 4,451,141 | 5/1984 | Thebault | 355/28 |
| 4,567,356 | 1/1986 | Signoretto | 235/375 |
| 4,574,692 | 3/1986 | Wahli | 355/40 X |
| 4,607,949 | 8/1986 | Hakamada et al. | 355/40 |
| 4,627,719 | 12/1986 | Nitsch et al. | 355/41 |
| 4,637,712 | 1/1987 | Arnold et al. | 355/77 X |
| 4,650,314 | 3/1987 | Grunwald | 355/40 |
| 4,728,996 | 3/1988 | Matsumoto | 355/41 X |
| 4,760,574 | 7/1988 | Budworth et al. | 235/437 |
| 4,779,122 | 10/1988 | Signoretto | 355/40 X |
| 4,791,279 | 12/1988 | Signoretto | 354/105 X |
| 4,797,832 | 1/1989 | Axelrod et al. | 364/478 |
| 4,800,406 | 1/1989 | Signoretto | 354/105 |
| 4,806,990 | 2/1989 | Tahara | 355/77 |
| 4,812,879 | 3/1989 | Suzuki | 355/38 |
| 4,817,023 | 3/1989 | Yamaguchi et al. | 355/40 X |
| 4,821,061 | 4/1989 | Gudmundson et al. | 355/40 |
| 4,823,162 | 4/1989 | Renn et al. | 355/40 |
| 4,838,435 | 6/1989 | Alexandre et al. | 209/555 |
| 4,853,869 | 8/1989 | Durst, Jr. et al. | 364/478 |
| 4,862,200 | 8/1989 | Hicks | 355/40 |
| 4,862,386 | 8/1989 | Axelrod et al. | 364/518 |
| 4,870,257 | 9/1989 | Maginness et al. | 235/375 |
| 4,881,090 | 11/1989 | Signoretto | 354/105 |
| 4,888,613 | 12/1989 | Zangenfeind et al. | 355/41 |
| 4,931,832 | 6/1990 | Takenaka | 355/71 |
| 4,933,711 | 6/1990 | Gudmundson et al. | 355/40 |

(List continued on next page.)

FOREIGN PATENT DOCUMENTS 4038661  6/1991  Germany .

OTHER PUBLICATIONS

*Patent Abstracts of Japan*, vol. 17, No. 90 (p. 1492), 23 Feb. 1993, & JP-A-04 289840 (Fuji Photo Film) 14 Oct. 1992.
*Research Disclosure*, No. 172, Aug. 1978, (p. 63), Eastman Kodak Co., "Photofinishing System".

*Primary Examiner*—D. Rutledge
*Attorney, Agent, or Firm*—Peter J. Bilinski

[57] ABSTRACT

A process and apparatus are provided for printing individual customer rolls of photographic film in a batch that differs from the film batch during development. Individual film rolls are collected during printing in batches that are based in major part on optimizing the use of photographic paper. The film is scanned after development to determine information available only then, such as the image format, and the film is batched during printing based on efficient paper use. Each film roll is provided with a unique identification number that is used for tracking the film rolls throughout processing and printing. Information required for printing is entered into the system in association with the unique number and is used in combination with information determined after film development for optimizing the printing operation based on the paper required.

11 Claims, 9 Drawing Sheets

U.S. PATENT DOCUMENTS

| | | | |
|---|---|---|---|
| 4,937,617 | 6/1990 | Kito | 355/41 |
| 4,947,205 | 8/1990 | Benker et al. | 355/41 |
| 4,965,626 | 10/1990 | Robison et al. | 355/40 |
| 4,965,627 | 10/1990 | Robison | 355/40 |
| 4,967,381 | 10/1990 | Lane et al. | 364/551.01 |
| 4,974,096 | 11/1990 | Wash | 355/40 X |
| 4,975,732 | 12/1990 | Robison et al. | 355/40 |
| 4,975,736 | 12/1990 | Kito et al. | 355/77 |
| 4,977,419 | 12/1990 | Wash et al. | 354/106 X |
| 4,990,950 | 2/1991 | Tokuda | 355/38 |
| 5,021,820 | 6/1991 | Robison et al. | 355/40 |
| 5,023,655 | 6/1991 | Hicks | 355/39 |
| 5,025,283 | 6/1991 | Robison | 355/40 |
| 5,029,313 | 7/1991 | Robison et al. | 355/40 |
| 5,032,707 | 7/1991 | Gudmundson et al. | 355/40 |
| 5,093,684 | 3/1992 | Crochetierre et al. | 355/40 |
| 5,093,686 | 3/1992 | Shigaki | 355/77 |
| 5,119,126 | 6/1992 | Tokuda | 355/41 |
| 5,122,645 | 6/1992 | Saeki et al. | 235/37.5 X |
| 5,122,823 | 6/1992 | Baxter et al. | 354/212 |
| 5,124,742 | 6/1992 | Yoshikawa | 355/27 |
| 5,128,519 | 7/1992 | Tokuda | 235/375 |
| 5,200,777 | 4/1993 | Zander | 354/275 X |
| 5,231,439 | 7/1993 | Takahashi et al. | 354/320 X |
| 5,353,095 | 10/1994 | Terashita | 355/38 |
| 5,404,196 | 4/1995 | Terashita | 355/38 X |

FIG. I

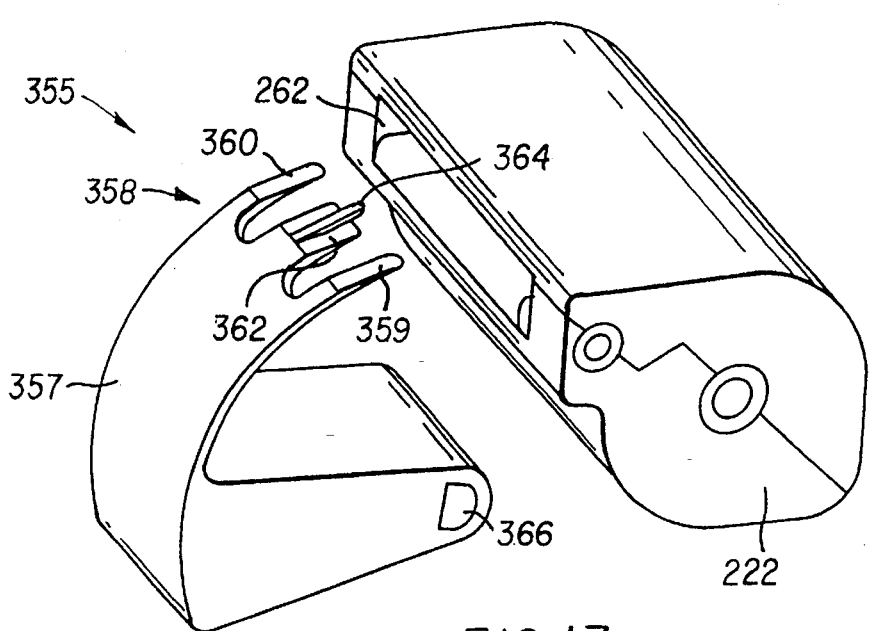
FIG. 17
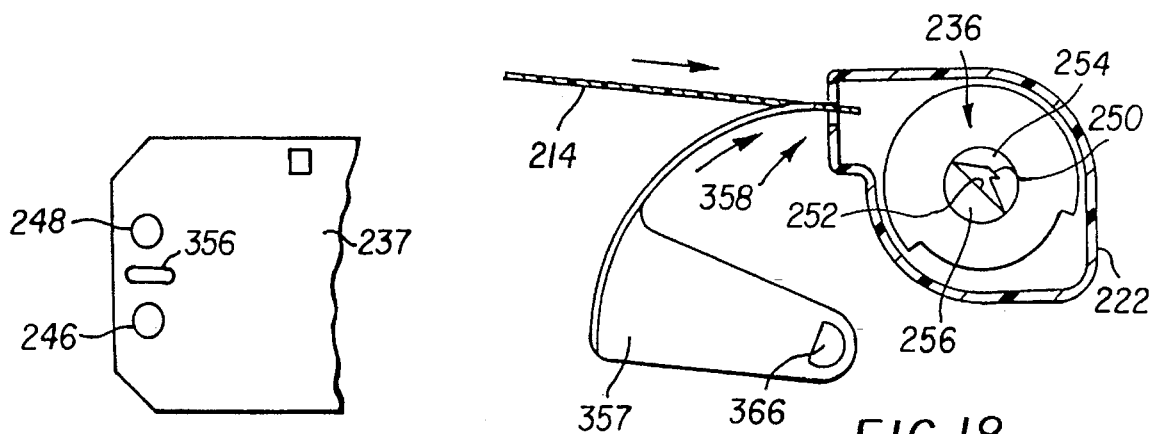
FIG. 20
FIG. 18
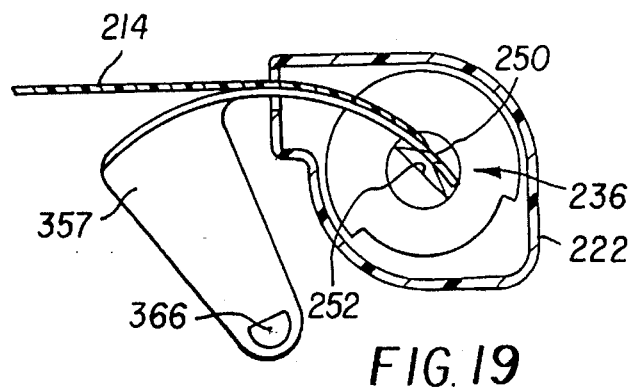
FIG. 19

RANDOM BATCH PHOTOFINISHING

CROSS REFERENCE TO RELATED APPLICATIONS

Reference is made to the following commonly assigned U.S. Patent Applications, all filed on even date herewith: Ser. No. 08/242,091 entitled ORDER CODING, filed in the name of Walter C. Slater et al.; Ser. No. 08/241,985, now U.S. Pat. No. 5,426,481, entitled ORDER FINISHING, filed in the name of Walter C. Slater et al.; and Ser. No. 08/242,563, now U.S. Pat. No. 5,493,352, entitled FILM CARTRIDGE MAGAZINE, filed in the name of Allan G. Reddig et al. The disclosures of the above-referenced applications hereby are incorporated into the present specification.

BACKGROUND OF THE INVENTION

1. Field of Invention

The invention relates to photographic processing, and more specifically to film development and printing according to instructions provided by the customer and information recorded on the film.

2. Description of the Prior Art

Modern processes for converting photographic exposures on film into finished prints on paper are highly automated. Individual rolls of film contained in cartridges usually arrive at the processing facility in envelopes identifying the dealer or other customer and including instructions for processing. The film rolls are removed from the cartridges, sorted and spliced together on large reels to facilitate high-speed film development. The resulting negatives are projected onto photographic paper to enlarge the images and produce the requested number of copies. The paper is then developed and finished by cutting it into prints. The film is cut into several strips that match the customer's original film roll, and the strips are packaged with their corresponding prints for return to the customer.

The envelopes are retained throughout the process in the same order as the spliced film rolls, so the process sequence can be used for matching the envelopes with the other components of the order. The envelopes carry the dealer identification and customer name and address, and are used for returning the order to the customer. Frequently the corresponding envelope, film and prints are provided with a linking identification number, called a "splice ID," that can be used to assist the matching process in case the original sequence of any of the order components is disturbed.

Reorders of additional prints may occur sometime after first-time development and printing. The reorder film strips are not spliced into the film rolls with the first-time orders, but are handled off-line with other reorders. Reorders are typically laminated on a tow web which is transported through the printer having a specially designed reorder deck.

PROBLEM SOLVED BY THE INVENTION

Automated processes in use today rely on sorting and batching of the film rolls before they are spliced together for processing. The order of the rolls is established from the very beginning, and that same order is maintained throughout the entire process. This slows the operation from the start, waiting for the accumulation of orders so as to compile proper batch size for efficient processing. It also results in an order that may be optimal for some processing operations but not for others. In particular, bulk paper roll in the printer is committed before its length can be compared or matched with the linear feet of prints actually required for any particular batch.

Efficient processing depends on a one-to-one relationship between the spliced film roll and the paper roll. The spliced film roll (batch) is accumulated to a size that will use a complete paper roll without running over. This is a guessing game because insufficient information is available to make the required decisions before the film is processed. A smaller accumulated film roll will reduce the risk of running over. It also increases the total consumption of paper allocated to the leaders and trailers required at the beginning and end of each paper batch, and increases the number of setups for batching both the film and the paper. A larger accumulated film roll, on the other hand, might be more efficient, but only at the risk of overrunning the paper roll. This sometimes requires splitting the film roll, and is an efficiency disaster.

Recently proposed cameras are capable of exposing images in different formats or sizes interspersed on a single film roll. Prior art processes are particularly difficult to run efficiently with film from such cameras. The photofinisher normally will not know the exposed image sizes, or the number of good prints, until after film development.

Reorders of additional prints present still other problems, primarily because hardware configurations at the printer prevent commingling of reorders in the same printing batches as first-time orders.

SUMMARY OF THE INVENTION

The present invention is directed to overcoming one or more of the problems set forth above. Briefly summarized, according to one aspect of the invention, a process and apparatus are provided for printing photographic film in a batch that differs from the batch established for film development. Batches of film rolls are formed during or just prior to printing according to parameters established after film development, and based in major part on the use of photographic paper.

In accordance with other features of the invention, the film is scanned after its development to determine information available only then, such as the sizes and number of good negatives to be printed. The film is batched during printing for efficiency, and the batches are maintained with the film rolls in the same order after printing until the paper is cut into prints and is ready for packaging.

In accordance with still other features of the invention, each film roll is provided with a unique identification number that is used for tracking the film rolls throughout developing, printing and finishing. Information required for printing, such as the number and size of the prints requested by the customer, is tracked in association with the unique number and is used for optimizing the printing operation based on the paper required to make the number and size of prints requested. Optimization uses a combination of the customer provided information and the information determined after film development.

Since the film is batched during the printing operation, minimal sorting is required prior to film development. There is no waiting for the accumulation of suitable printer batches. Film moves quickly to processing and is batched for printing after the negatives are developed, when more information is available, including the number of good prints and their format. Information from the customer and information that is known or retrievable only after the negatives are developed can be combined during printing to establish the most efficient film batches and to optimize use of photographic paper.

Paper-roll splicing is not required. The film and paper batches are established during printing for a proper match without splicing.

Reorders of additional prints and first-time orders for processing and printing all can be combined randomly in the same printing batch and handled "on-line" throughout the subsequent finishing operations.

These and other features and advantages will be more clearly understood and appreciated from a review of the following detailed description of the preferred embodiment and appended claims, and by reference to the accompanying drawings.

BRIEF DESCRIPTION OF THE DRAWINGS

FIG. 8 represents the detaching station, and depicts a cartridge with the film being removed. FIG. 9 depicts the trailing end of the film strip and its features that attach the film strip to the cartridge. FIG. 10 shows a detaching tool that engages the trailing end of the film strip to remove it from hooks in the spool. FIG. 11 depicts the operation of the tool illustrated in FIG. 10.

FIG. 12 depicts the various elements of the desplicer. FIGS. 13 and 14 represent its operation. FIGS. 15 and 16 show the film strips before and after desplicing, respectively.

FIGS. 17–20 are schematic representations of a reattaching device for reloading a cartridge with the same film strip it contained before the processing operation. FIG. 17 depicts the cartridge and a reattaching tool. FIGS. 18 and 19 show the operation of the tool to reattach the film strip to the cartridge. FIG. 20 shows details of the film strip at its trailing end for engaging corresponding attaching elements in the cartridge.

DESCRIPTION OF THE PREFERRED EMBODIMENTS

Figure 1:
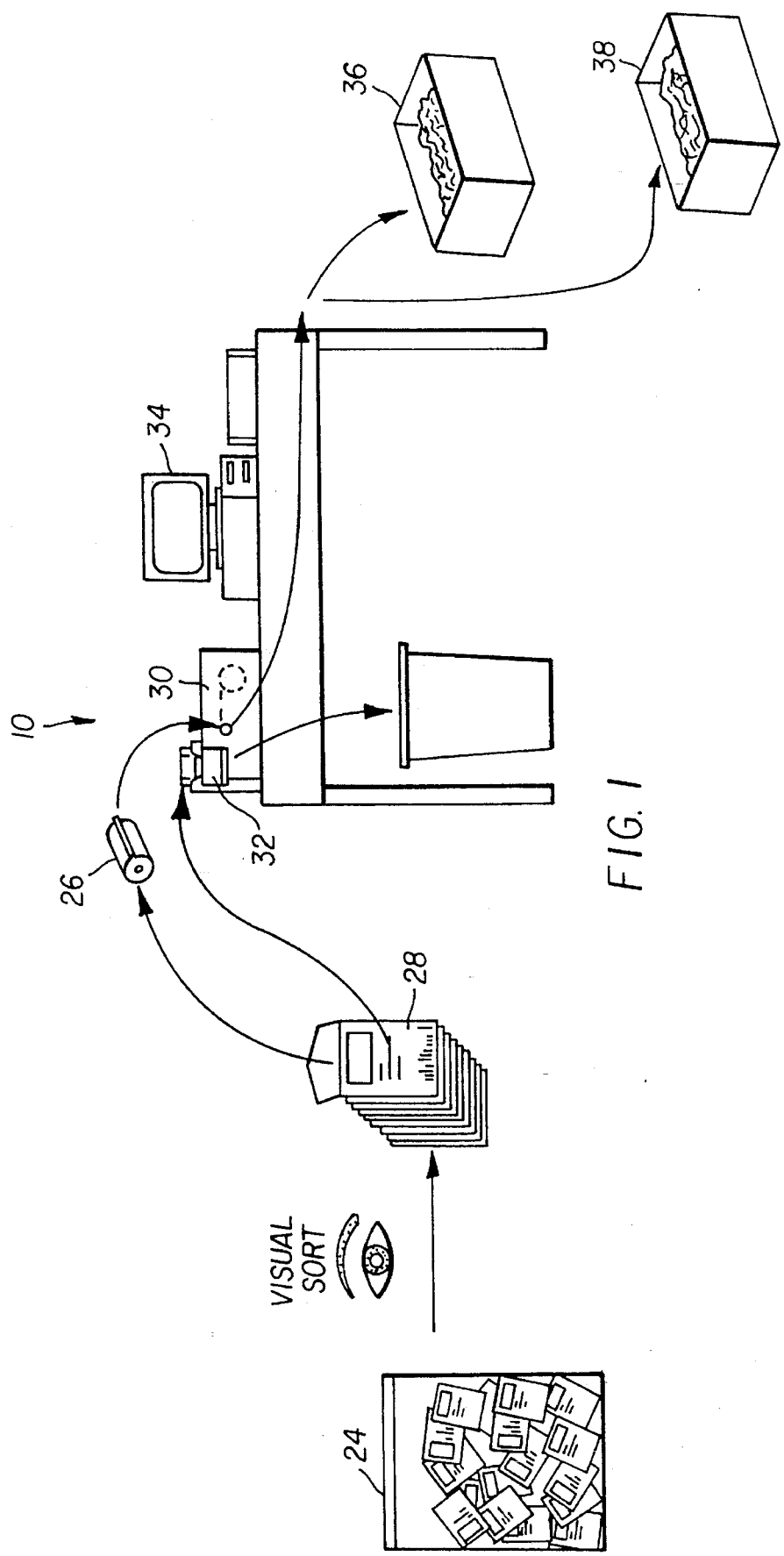
FIG. 1 is a schematic representation of a receiving station for use in connection with the invention, including a scanner and order entry terminal for recording information from the customer.

Referring now to the drawings and to a preferred embodiment of the invention, a number of automated stations are depicted for processing photographic film into finished prints according to customer provided instructions. The stations include order entry 10 (FIG. 1), film development 12 (FIG. 2), machine sorting 14 (FIG. 2), printing 16 (FIGS. 3 and 4), paper development 18 (FIG. 5), finishing 20 (FIG. 5) and information processing and control 22 (FIG. 6).

Order Entry

Rolls of film are received from dealers in large bags or bins 24 (FIG. 1), carrying film rolls contained in cartridges in dealer envelopes. The envelopes that arrive with the film include customer provided instructions for the number, size and surface finish desired for the prints. The envelopes also identify the dealer and contain the name of the customer and the address for returning the order when it is finished.

The film rolls and cartridges that will be described according to the preferred embodiment are referred to as thrust loading, and are described more fully in Baxter et al U.S. Pat. No. 5,122,823, issued Jun. 16, 1992; and Zander U.S. Pat. No. 5,200,777 issued Apr. 6, 1993. The film is retained with the cartridge during film processing and printing, preferably by attachment to a film spool inside the cartridge, and is extended by unwinding the film for the various processing and printing operations. The cartridge is designed so the outermost convolution of film is stripped from its roll by such unwinding and expelled through the cartridge opening.

The film rolls 26 are removed from the envelopes 28 and scanned at reader 30 for a unique identification number applied to the film cartridge by the manufacturer. The unique number, sometimes called a CID, or cartridge identification, is a bar code or other machine readable mark that may be combined with information about the type of film in the cartridge and its roll length. The CID is used throughout the processing operation at the respective stations to track each film cartridge on an individual basis and to determine or retrieve information about the film pertinent to its processing.

At the same time the CID is read from the film cartridge, the customer supplied instructions are read from the envelope at scanner 32 and tagged to the CID number so the instructions associated with any particular cartridge or customer order can be retrieved from the system at any time, and at any processing station, using the CID. Instructions on the envelope that are not machine readable are coded into the system by a human operator at terminal 34.

Processing

Although film rolls may be collected for a short period, accumulation is not required and the rolls are moved quickly into station 12 (FIG. 2) for developing the latent images on the film into printable negatives. Of course re-orders do not require development at this station and are, therefore, moved directly to auto-sorting station 14 for printing. A tote 36 is disclosed for this purpose, but a conveyer or other automated approach might be more efficient.

No particular order of the film units is required for development and the rolls are not spliced. Instead, each film roll is handled together with its cartridge as an individual unit that is developed by extending or thrusting the film from its containing cartridge and moving it between the required processing solutions so the film will extend from the cartridge into the solutions.

Figure 2:
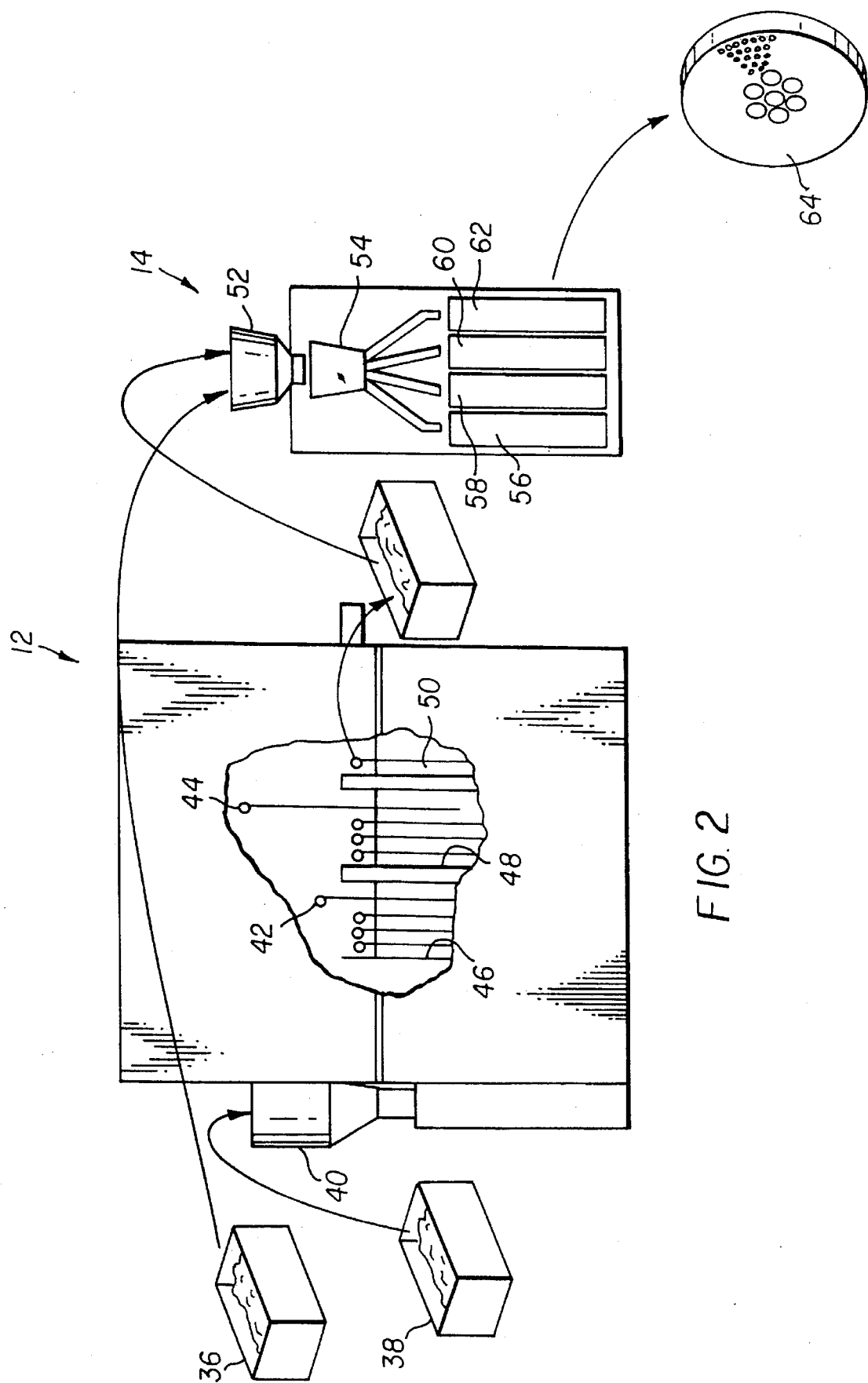
FIG. 2 is a schematic representation of film developing and machine sorting stations for use with the invention, depicting a process for developing individual film rolls in one order.

Referring to FIG. 2, the film rolls in their respective cartridges are loaded randomly from tote 38 into hopper 40, from which they are retrieved and manipulated through a process sometimes referred to as dip-and-dunk. Film rolls 42 and 44, for example, are extended from their cartridges and lowered into a plurality of tanks 46, 48 and 50 of developing solutions, one-tank-after-another, according to a conventional developing process. After development, the film is rewound into the same cartridge for movement to the next station. Preferably, the film is actually attached to the cartridge so it will not accidentally separate therefrom or from the unique CID. In alternative embodiments, however, the film may be temporarily separated from and reattached to its cartridge during the processing operation.

Machine Sorting

After the film is developed into printable negatives, it moves by tote or conveyer to hopper 52 of station 14 for machine sorting. The rolls might be segregated, for example, according to print width and the requested paper surface. Other sort options include dealer or retailer. However, any other sort parameter may be used. The rolls move from hopper 52 through section 54, which reads the CID from the cartridge, retrieves the customer provided information associated therewith and directs the film rolls into various bins 56, 58, 60 and 62, depending on the sorting parameters. The film rolls from each bin then are collected in film loading magazines 64 that are suitable for carrying the film in cartridges between the respective stations and for loading the film with its cartridge into the printer. The film rolls are collected in the magazine for printing in an order that is not related in any particular manner to the order in which the film rolls were developed. Alternatively, the cartridges can be loaded into tote bins or conveyors for delivery to the printer wherein said cartridge is identified by its CID number.

Printing

Figure 3:
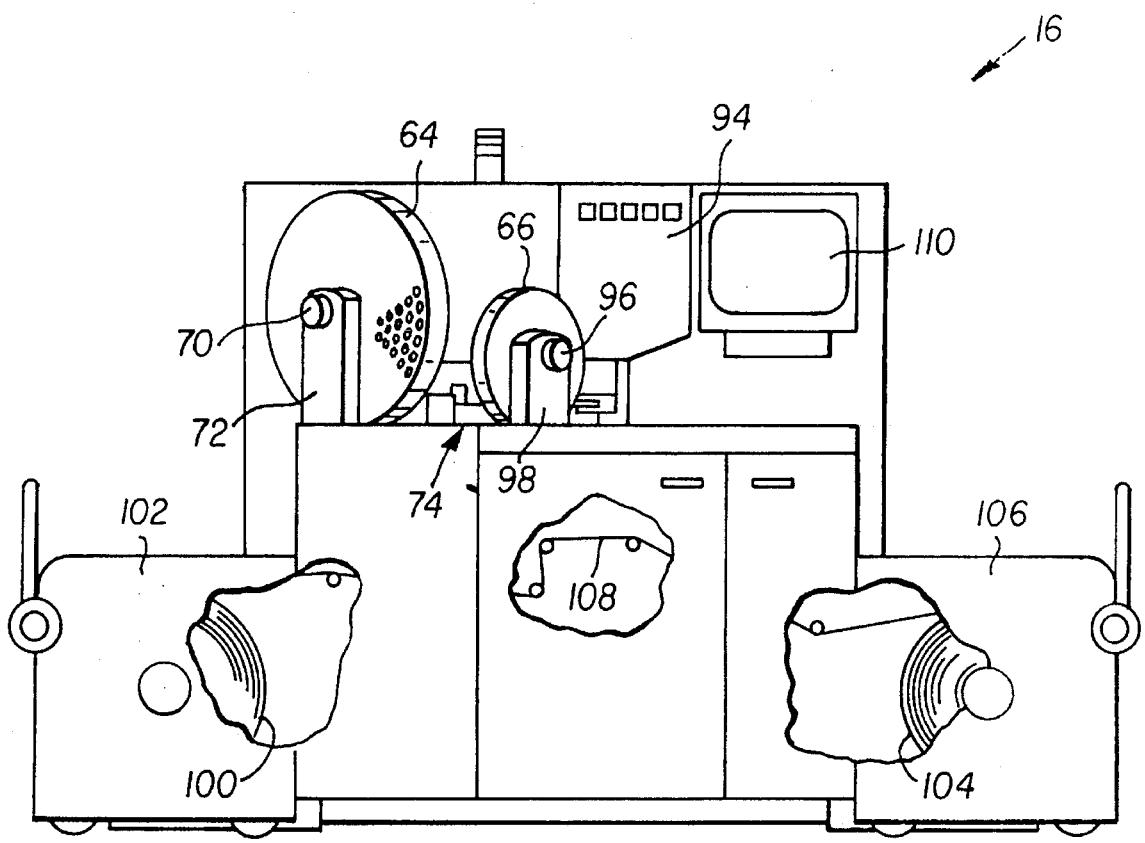
FIG. 3 is a schematic front elevation view of a printing station in accordance with the present invention, depicting the printing of images from film rolls in an order different from the order of development.
Figure 4:
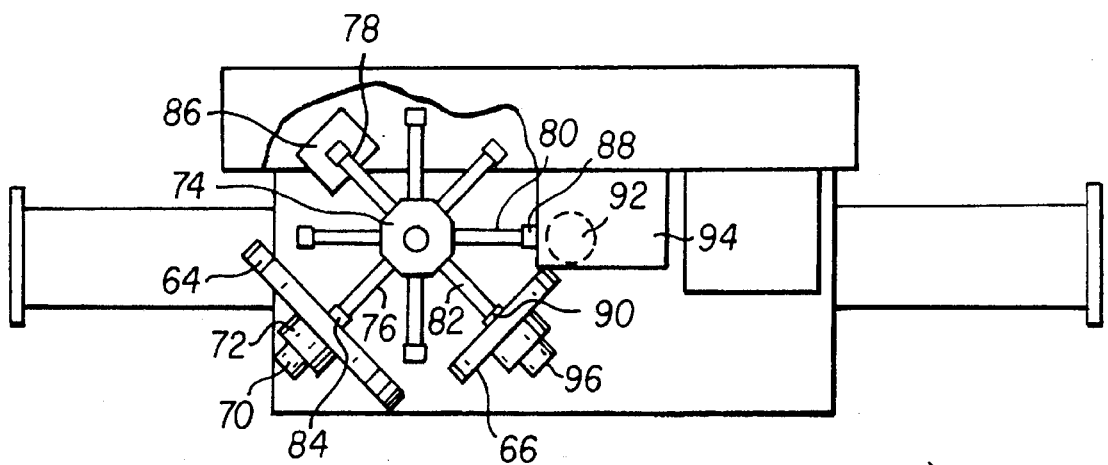
FIG. 4 is a schematic top view of the printing station of FIG. 3, depicting a turret for handling the film rolls during the printing operation.

Referring now to FIGS. 3 and 4, a printing operation is depicted in which the film rolls are loaded for printing one-at-a-time from the film loading magazine 64, and unloaded after printing into a film batching magazine 66. The magazine 66 defines a batch of film rolls, in the same sequence they were printed, and maintains that batch and sequence for the remainder of the processing operations until the film is matched with the developed prints for packaging and return. The batch size is established during the printing operation for improved efficiency and particularly regarding the use of photographic paper. A preferred cartridge magazine suitable for use with the invention is disclosed in the above referenced Reddig application Ser. No. 08/242,563, now U.S. Pat. No. 5,493,352.

Film loading magazine 64 is mounted in printer 16 on a rotary support 70 suspended on arm 72 above a film-handling spider-turret 74. The film rolls are pushed from the magazine by a push-rod, or the like, and are manipulated between the printing stations by the turret until loaded after printing into the batching magazine 66.

The turret includes a number of radially-extending reciprocatable arms represented at 76, 78, 80 and 82, that index with the turret between the respective work stations 84, 86, 88, and 90. The work stations include a loading station 84, adjacent loading magazine 64, for removing the film rolls from the loading magazine; a scanning station 86, for scanning the film to determine various printing characteristics of the negatives; a printing station 88, where the film images are exposed to a light source 92 in lamp house 94, for projecting images of the negatives through appropriate optics (not shown) onto the photographic paper; and an unloading station 82 for positioning the film rolls in the batching magazine 66. Like the loading magazine 64, the batching magazine is mounted for rotation at 96 on arm 98.

Photographic paper is supplied in large rolls 100 contained in light-tight paper magazines 102, at one end of the printer, and taken-up after printing in similar rolls 104 and magazines 106 at the other end of the printer. Between the supply and take-up rolls, 100 and 104, the paper is threaded though a print exposure section 108 where it is tensioned for exposure to the image projected from exposure station 88 by light source 92 and associated optics (not shown).

Communications and set-up of the printing operation is provided through communication channels at the printer represented by CRT 110.

In operation, film rolls are mounted on the printer substantially in random order at the loading station 84 and moved through the respective printer stations, one-at-a-time by the spider turret 74. At each station the film is extended from its cartridge by unwinding and the information required by that station is retrieved from the image processing and control network using the unique cartridge identification number (CID). The operation for that particular station is completed, and the film is rewound into the same cartridge for indexing to the next station. When all printing operations are completed, the film rolls are loaded into the batching magazine 66 to retain the order in which they were printed and for movement to the finishing stations.

During printing, the film rolls are batched for improved efficiency considering the size of the paper roll. The length of each paper roll is known from its production, and is entered into the image processing and control network computer. Each film roll is scanned and printed to efficiently use that particular length of paper and then is batched for the remainder of the processing operation. Scanning station 86 scans the film to determine which negative images are sufficiently good for printing and to determine the format or size of the image that will be printed. This information is used to calculate the linear feet of photographic paper employed, and, on a film roll-by-roll basis, how many film rolls should be printed to efficiently fill the paper roll. This is the number of film rolls that will be loaded into the batching magazine 66 before it, and the associated paper roll 104, is removed from the printer. While a one-to-one relationship between the batching magazine and paper roll is not required, whole number multiples are preferred. Additionally, any predetermined length or number of orders can also be specified.

Paper Development

Figure 5:
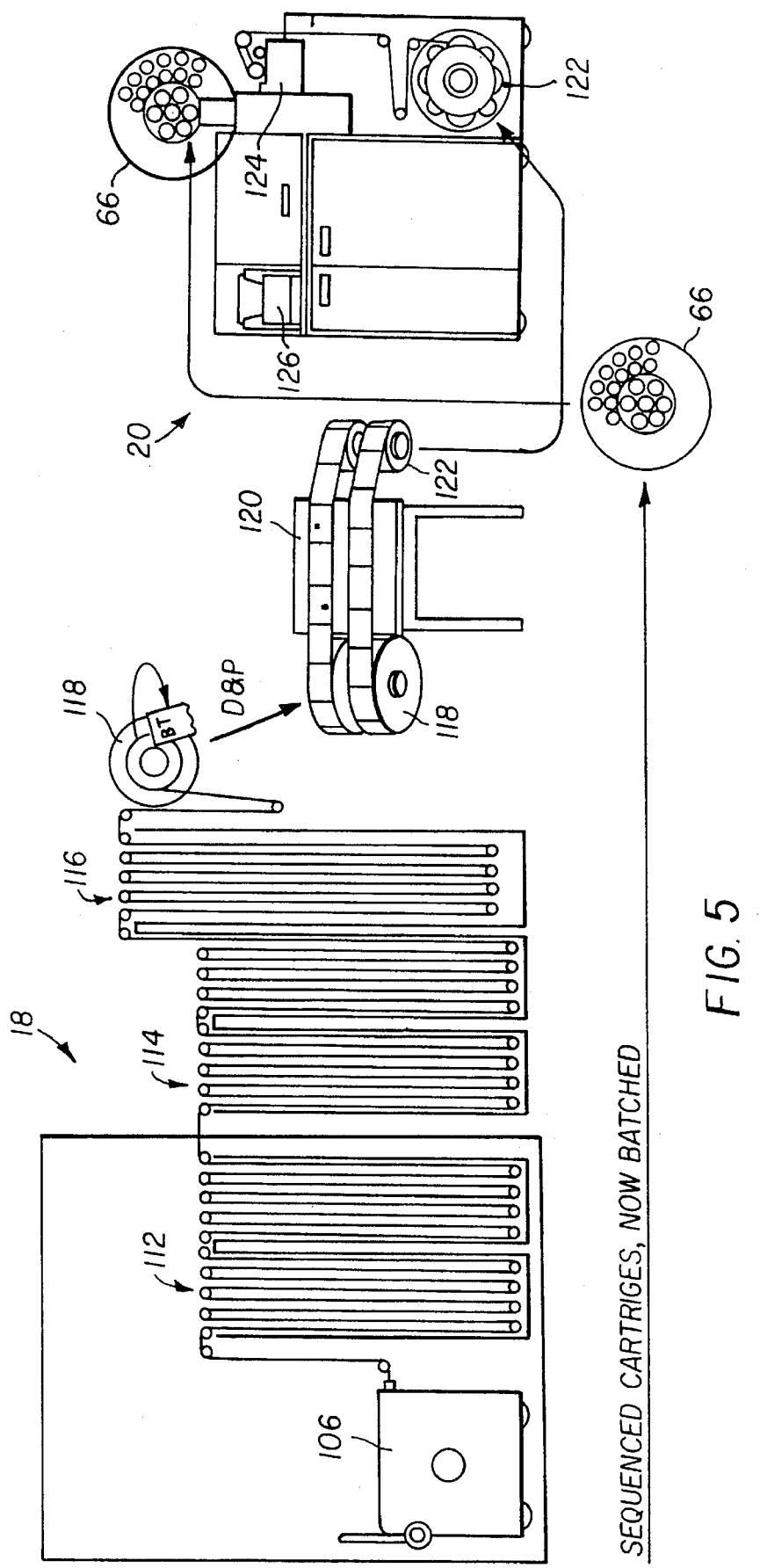
FIG. 5 is a schematic representation of paper processing, inspection and finishing stations for use with the invention.
Figure 6:
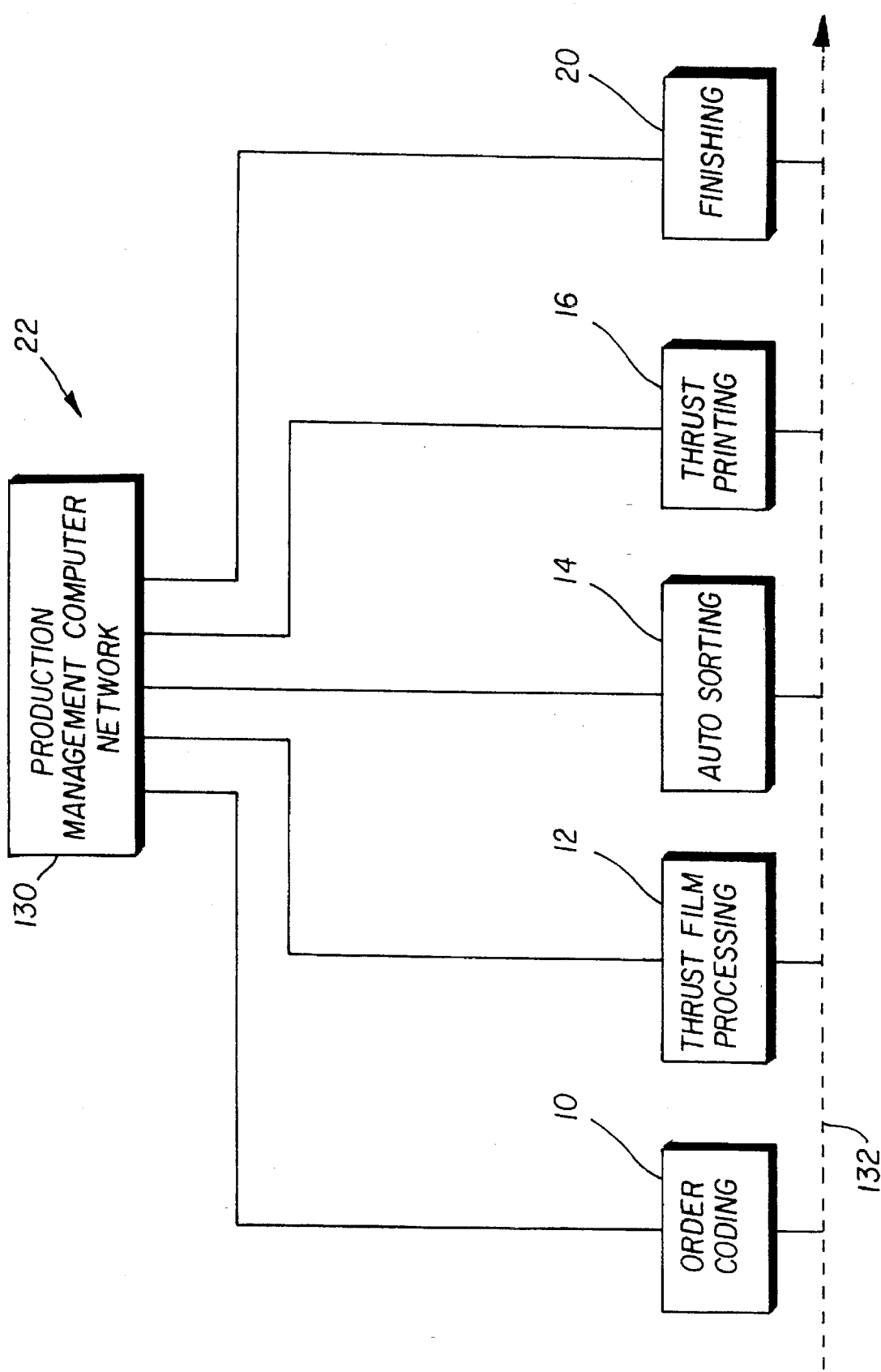
FIG. 6 is a block diagram depicting the system for processing information associated with the film rolls, customer instructions and post-development information used for optimizing the printing and related operations.

FIG. 5 depicts the paper developing operation. The paper rolls 104 are transferred from the printer to the developing station in their light tight magazines 106. The paper is withdrawn in a dark room and threaded for development through a plurality of developing solutions in tanks 112 and 114, and a drying chamber 116, according to conventional processes. After drying the prints are wound into rolls 118 for delivery to the inspection and finishing stations.

Finishing

After development, the prints, which may be visually inspected at table 120, and rewound into rolls 122 for finishing in station 20. The paper is cut into individual prints at station 124, matched with the appropriate film roll from batching magazine 66 and packaged in a new envelope retrieved from supply 126 for return to the customer. The film rolls, which have been retained in their batched order from the printer, easily are matched with their corresponding prints.

Information Processing and Control

FIG. 6 depicts the information processing and control network, including a production management computer 130 coupled to logic associated with each of the processing stations. At order coding, the roll and cartridge ID is scanned and tagged with the associated information required for processing and returning the order. At the film developing station the cartridge ID may be used to determine the film type for processing. During auto-sorting, the unique number is used to retrieve the customers instructions, dealer information or any other information regarding paper surface and size requested. At printing the customer information is used to determine the number of prints, and may be printed onto the backs of the prints to facilitate order matching in the finishing station where the prints are cut, matched with the corresponding film roll and packaged for return to the customer.

It should now be apparent that an improved process and apparatus have been provided for batching film rolls during printing in an order that differs from the order of film development. The approach improves overall efficiency by considering the printing operation and the length of the paper roll. At the same time, the process and apparatus eliminate the time previously required to accumulate film rolls prior to initiating film development.

DESCRIPTION OF AN ALTERNATIVE EMBODIMENT

FIGS. 7–20 disclose an alternative embodiment of the invention that differs from the preferred embodiment only at the front end, before the film is batched during printing. The film is removed from its cartridge and spliced together with other film strips for film development in a conventional cine process. The developed film is then despliced and reinserted into the same cartridge from which it was removed. Like the preferred embodiment, the film is batched for printing, printed and returned to the dealer and customer in the cartridge.

Film Format

The film format used in this alternative embodiment is a roll of strip film contained in a cartridge somewhat similar to existing products often referred to as the thirty five millimeter (35 mm) format. It differs, however, in a number of respects including a magnetic coating on the film surface suitable for use in a camera to record parameters of the camera exposure. This feature is sometimes referred to as magnetics-on-film (MOF), and is provided for recording the flash setting and other exposure conditions. More importantly for this description, the magnetically-recorded information preferably identifies the desired print format, for example regular, portrait or panoramic format. The print format is selected through the camera when the film is exposed, and must be identified later, when the film is processed, to match the desired image format with the proper printing optics and frames. Of course some cameras may not have magnetic recording capability. In such cameras the image format information typically will be recorded optically on the film. When optically recorded, the image format information, e.g. regular or panoramic, is represented by the presence or absence of an exposed film area called a FAT bit. Since the FAT bit, like the image, is not visible until the film is developed, the image format cannot be determined until then. A particularly advantageous feature of the present invention permits printer batching after development, when the FAT bit and picture format are known.

Certain film types differ also in their capability for being removed from their cartridge without damaging the film or the cartridge, and a related capability for loading the film back into the very same cartridge from which it was removed. These capabilities are described more fully in U.S. patent application Ser. No. 08/098,112, now U.S. Pat. No. 5,465,920, entitled A Tool And Method For Detaching A Trailing End Portion Of A Filmstrip From At Least One Hook Atop A Ramp On A Film Spool Inside A Film Cartridge, filed Jul. 27, 1993, in the name of Thomas C. Merle et al.

Rough Sort

Figure 7:
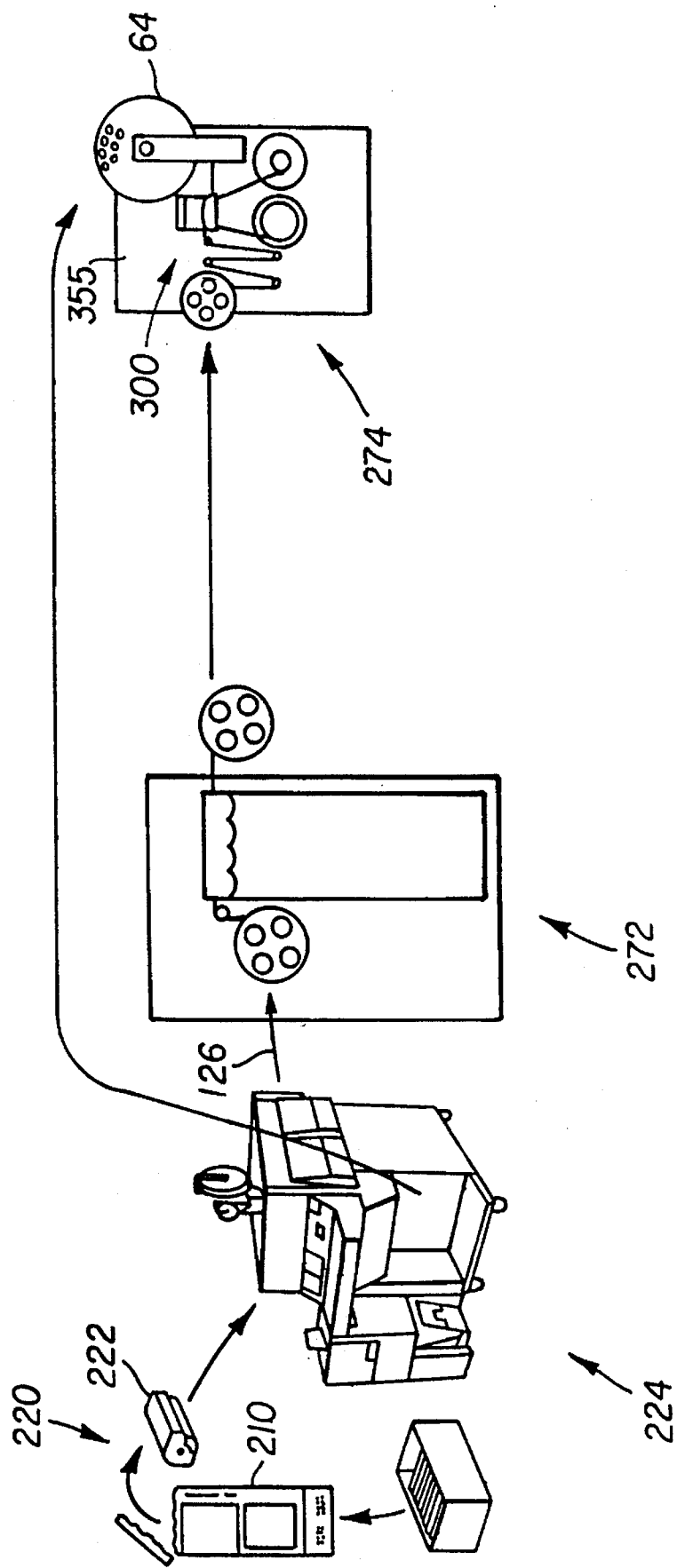
FIG. 7 is a schematic view of an alternative embodiment of the invention, including stations for splicing, processing and then desplicing the film before printing.
Figure 8:
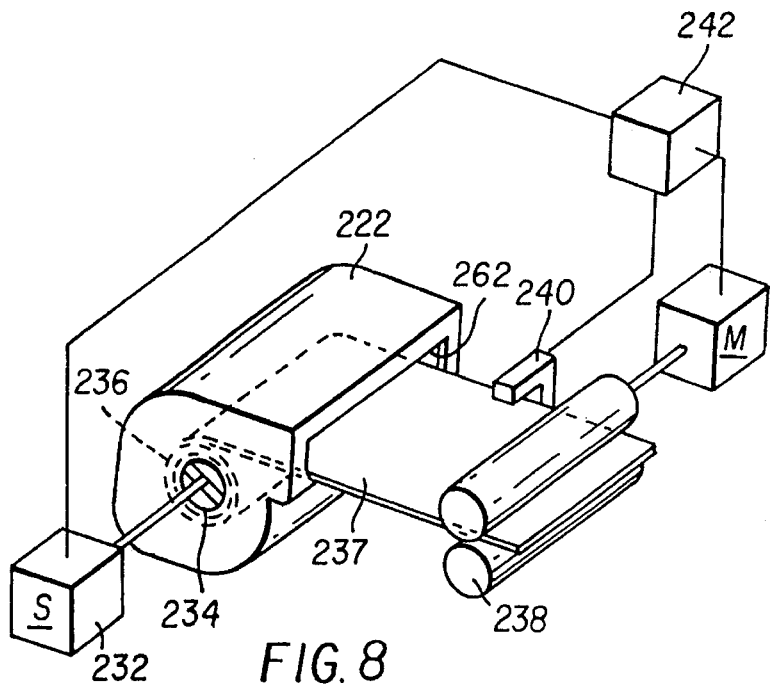
FIGS. 8–11 are schematic views representing mechanisms for detaching and removing film strips from their cartridges prior to processing, according to the alternative embodiment.
Figure 9:
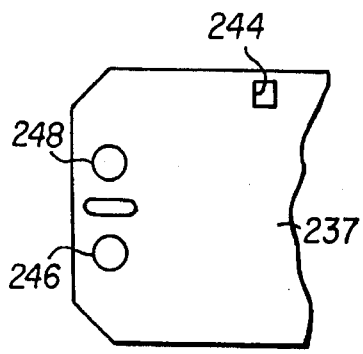
Figure 10:
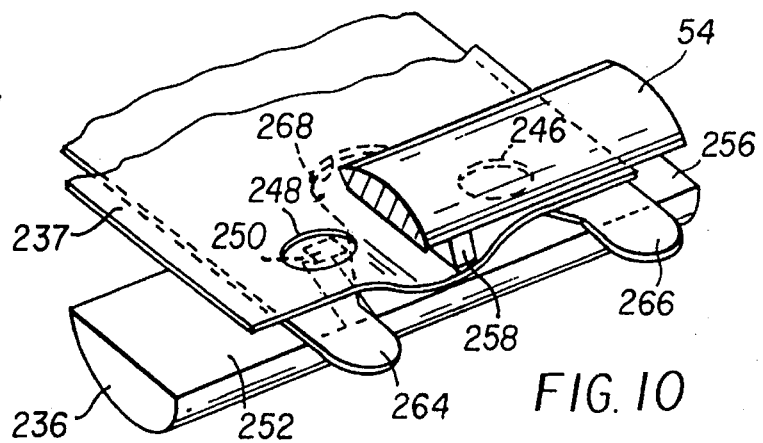
Figure 11:
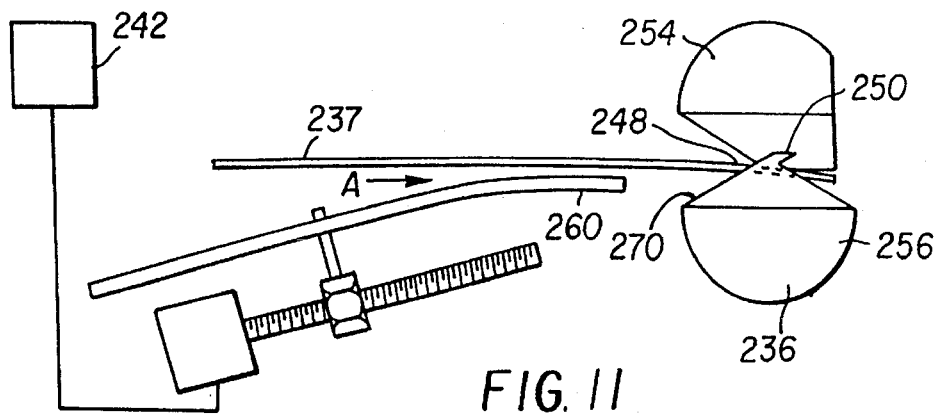
Figure 12:
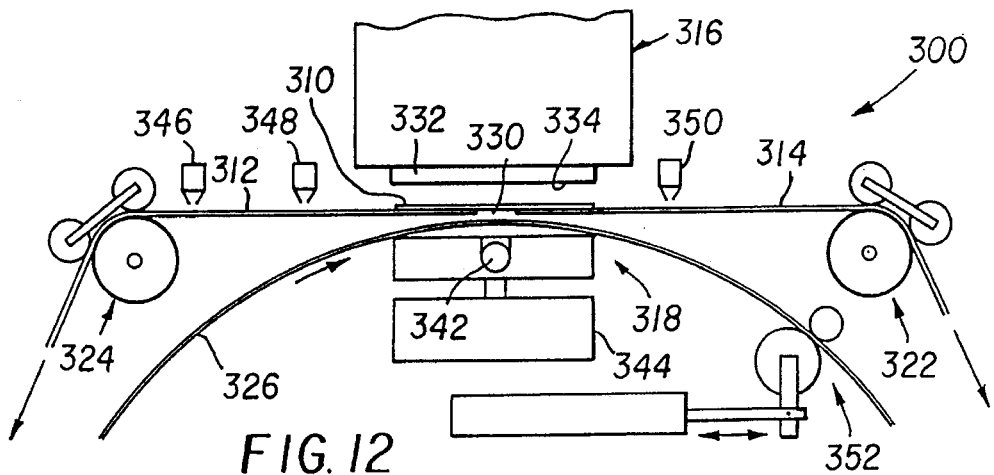
FIGS. 12–16 are schematic representations of a desplicing operation according to the preferred embodiment.

Referring first to FIG. 7, film is delivered to the processing facility in envelopes 210 representing individual customer orders. The envelopes contain one or more rolls of film, usually in cartridges, and include instructions from the customer for processing.

The film is rough sorted by product format and service requested. This embodiment of the invention has particular utility and will be described in connection with the APS format characterized above. The description is limited primarily to first time orders for development and printing (D&P), but is suitable also for reorders.

In many respects rough sorting is similar to existing processes that isolate the film rolls by common characteristics for film processing. It differs, however, in that printing parameters need not be considered at this early stage. Batching for printing may be different, need not be established until after film processing, and may consider information, such as the FAT bit, that is not available until after film processing.

The cartridges 222 are removed at 220 from their envelopes 210 and loaded into a film detaching and splicing station 224.

Film Detaching and Splicing

The detaching and splicing station 224 has four functions: a) it captures information from the envelope, reads the cartridge identification (CID), and stores both with an assigned local product code (LPC) depending on the dealer and other information needed for pricing; b) it detaches and removes the film from its cartridge without damaging the film or the cartridge; c) it splices the removed film strips into larger rolls using conventional equipment, similar to a commercial product sold under the name "Gretag Imaging Ultimax", and d) it loads the empty cartridges into a cartridge magazine in the same sequential order as the spliced film strips. The cartridge magazine is the same magazine 64 used in connection with the preferred embodiment.

The film detaching section, represented by FIGS. 8–11, non-destructively removes the film strips from their cartridges, directs the strips to a conventional film splicer, and directs the empty cartridges, in sequence, for loading into the cartridge magazine.

A stepper motor 232 engages and rotates an accessible portion 234 of the cartridge spool 236 until the leading end of the film strip 237 is pushed into a film drive 238. The film drive pulls the film from the cartridge and directs the film to the splicing station 227, mentioned above. A sensing device 240 and control 242 watch for the trailing end of the film strip, identified by a film notch 244, and stop the drive 238 when the notch 244 is positioned properly.

The trailing end of the film strip 237 includes two apertures 246 and 248 that are captured over corresponding hooks 250 on cartridge spool 36. The spool includes a slot 252 defined between upper and lower semi-circular sections 254 and 256, respectively. The trailing end of the film 237 is threaded into the slot 252, between the upper and lower sections 254 and 256, and over the hooks 250. Extensions 258 flex the film slightly between the hooks and exert a bias urging the film toward spool section 254 and into position with the apertures engaging the base of the hooks.

When the film is to be detached or separated from the cartridge, a flexible tool 260 is moved into the cartridge through film conduit 262. The tool has a special configuration, including two rounded end sections 264 and 266 separated by an open center section 268. In operation, the tool 260 moves into the cartridge 222, through the conduit 262, and into engagement with the spool 236 between the film 237 and the lower spool section 256. The tool then rides up the ramped side 270 of the hooks 250, between the film 237 and the hooks 250, and pushes the film 237 off of the hooks 250 to release the film from the spool 236 without damaging the film or the cartridge. The open center section 268 of the tool accommodates spool extensions 258 so the tool end sections 264 and 266 will straddle the extensions 258 without interference.

The drive 238 is then operated again to advance the film to the splicing section where the leading end is spliced to the previous film strip. The detaching tool 260 is retracted from the cartridge just emptied of film, and the cartridge is moved along a chute to the cartridge magazine.

The sequential order of the cartridges 222, and the film strips are retained through film development, but may be retrieved in forward or reverse order. Unless otherwise specified, the terms sequence and order, when not modified by forward or reverse, include both the forward and reverse directions.

Film Processing

The cine film processor 272 (FIG. 7) is a conventional design and may be selected from a number of commercially available products for developing latent film images into printable positives or negatives.

Although not depicted on the drawings, the spliced film may be inspected before processing, particularly for splice integrity, and one or more spliced batches may be combined into larger batches for processing efficiency.

After processing, the film strips move to a desplicing and reattaching station, 274 (FIG. 7), for separation into strips, and for reattachment and loading of the separated strips into the same cartridges from which they were removed before splicing.

Film Desplicing and Reattaching

The desplicing apparatus 274 will be described briefly in two parts: a) desplicing 300 (FIGS. 12–16), and b) reattaching 355 (FIGS. 17–20). The desplicing apparatus 300 is described in more detail in U.S. patent application Ser. No. 08/171,950, Filed on Dec. 22, 1993, now U.S. Pat. No. 5,373,339. The reattaching apparatus 355 is described in more detail in U.S. patent application Ser. No. 08/171,790, also filed on Dec. 22, 1993, now U.S. Pat. No. 5,439,186.

Desplicing

The preferred desplicing apparatus 300 is depicted in FIGS. 12–16, and is adapted to remove a splice 310 from first and second film strips 312 and 314. The apparatus includes: a) a heating head 316 and opposed platen 318, that move one relative to the other for capturing and heating the splice 310; b) first and second drives 322 (FIG. 14) and 324, for transporting the film strips in the apparatus and for pulling the strips apart from the heated splice; and, c) a disposable splice pick-up web 326 that advances to carry the removed splices away for subsequent disposal.

Splice 310 is typical of products used by the photofinishing industry today and includes treated paper with a layer of thermal adhesive 328 on one surface. The splice 310 is applied to the film strips 312 and 314 with heat and pressure. The film strips thus are coupled securely together with a longitudinal spacing 330 between the strips for purposes to be described hereinafter.

Head 316 includes a heating shoe 332, ending in a hot plate 334 for engaging and heating the splice uniformly. The shoe 232 reciprocates in the head between a raised position removed from the platen and a lowered position where it will engage a splice supported on the platen.

The head preferably is biased toward the raised position and is moved with air pressure to the lowered position to exert a pressure on the splice 310.

Included in the platen 318, however, is an elongate pressure rod 342, that is supported for both rotation and reciprocation perpendicular to the splice or toward the hot shoe 332. Reciprocation is provided under pressure from an air supply 344 sufficient to overcome the opposed pressure from the hot shoe 332 and raise the shoe slightly away from the platen 318. Raising the hot shoe 332 relieves some of the pressure on the film strips so they can be pulled more easily from the splice, as will be described more fully hereinafter. The pressure rod 342 also serves as a concentrator, focusing the pressure with essentially line contact.

First and second film drives 322 and 324 are bi-directional and serve several functions. First they rotate in the same or forward direction to advance the film strips 312 and 314 into position with the splice 310 between the platen 318 and hot shoe 332. Later, after the splice adhesive is softened, the first and second drives are rotated to pull the two film strips apart in opposite directions, separating the strips from the splice. Finally, the drives 322 and 324 are operated in the same direction again to advance both film strips 312 and 314 through the desplicing station for the next operation in the process. Sensors 346, 348 and 350 determine the position of the film strips 312 and 314 at various times in the cycle for assisting in the control of the apparatus.

Pick-up web 326 is guided by the platen 318 to lie under the splice 310 above the pressure rod 342. The web 326 is advanced incrementally by a drive 352 and is wound into a roll (not shown), for capturing the removed splices as they are removed from the film strips.

Figure 13:
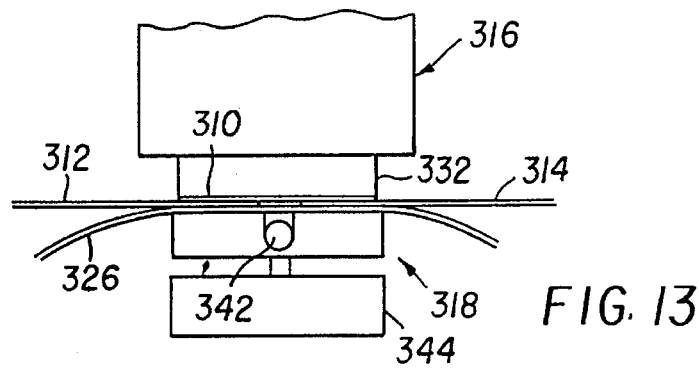
Figure 14:
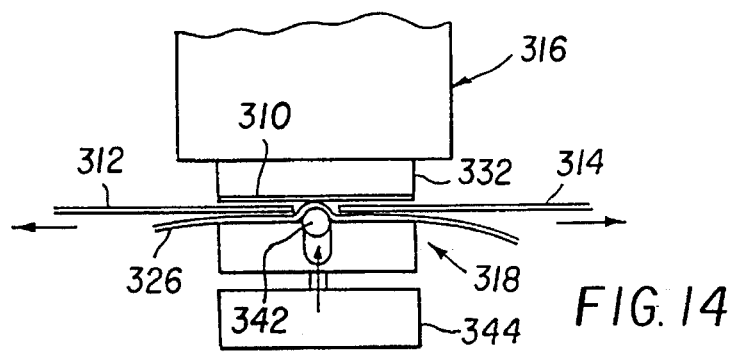
Figure 15:
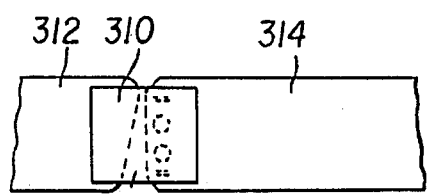

Referring now to the method of operation, spliced film strips 312 and 314 are advanced into the position depicted in FIG. 13, with the splice 310 between the hot plate 334 and the platen 318. The hot plate 334 is then moved into engagement with the splice 310, under pressure, to conductively heat the splice adhesive until it softens. After the adhesive is softened, the pressure rod 342 is actuated as depicted in FIG. 14 to engage the splice 310 through web 326 in the space between the film strips. The pressure rod is applied with enough force to raise the hot plate slightly and thereby release some of the pressure exerted on the film strips 312 and 314 by shoe 332. At the same time, the rod 342 captures the splice 310 against the hot plate 334. The film strips 312 and 314 are then pulled apart to separate the strips from the splice and each other. The pressure rod 342 and hot plate 334 are then lowered again to tack the splice to web 326, and the web is advanced to remove the splice from the area. Eventually, numerous splices will be wound into a roll convenient for disposal.

Figure 16:
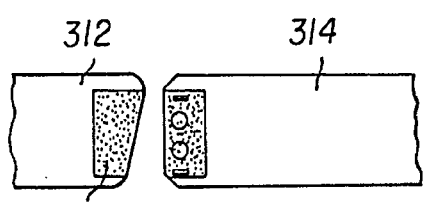

FIG. 16 depicts the two film strips after desplicing. Although some adhesive residue 328 may remain, the film strips are intact, retaining their original configuration from the time of manufacture. No cutting is required.

After desplicing, the film strips are reloaded into the same cartridge from which they were removed, and reattached to the cartridge spool.

Cartridge Reloading and Film Reattaching

Referring now to FIGS. 17–20 film reattaching apparatus 355 is depicted for reloading the film strips into the same cartridge from which they were separated. Pertinent features of the film strip 237 are most clearly shown in FIG. 20, including slot 356. Pertinent features of the cartridge spool 236 are most clearly illustrated in FIGS. 10 and 11, including slot 252 in spool 236 defined between upper and lower semi-circular sections 254 and 256, respectively.

Referring back again to FIGS. 17–20, a reattaching tool 357 includes features 358 adapted for engaging and pulling the trailing end of the film with the tool as the tool rotates into the cartridge through conduit 262. Inside the cartridge the tool 357 and its features 358 move the trailing film end into the slot 252 in spool 236 and over the spool hooks 250. When the tool is withdrawn, the film remains engaged over the spool hooks 250 attached to the cartridge through its spool. Rotation of the spool then winds the film into the cartridge where it is stored for return to the customer.

The features 358 on reattaching tool 357 include three fingers 359, 360 and 362, each defining a flat upper surface for engaging and supporting the trailing end of the film strip. Central finger 362 further includes a projection 364 adapted to enter the film slot 356. The tool is mounted on a drive shaft 366 for pivotal movement between a retracted position depicted in FIG. 17 and an inserted position depicted in FIG. 19. In the retracted position, the tool is removed from the cartridge 222. In the inserted position, the tool extends into the cartridge and the slot 252 in spool 236. When projection 364 on the tool engages a film strip 237 through film slot 356, pivoting of the tool into the cartridge will pull the film strip with the tool and into the spool slot 252. The film apertures 246 and 248 will slip over hooks 250 and remain attached thereto when the tool is returned to the removed position of FIG. 17.

Printer Batching

After the film strips are separated from each other, reattached and reinserted into the cartridges, they move to the machine sorting station 14 (FIG. 2), and a continue according to the preferred embodiment. Like the preferred embodiment, the cartridge batches established for printing differ from the batches established when the film was splicing for development. Overall efficiency is improved by establishing new batches that consider the printing operation and the length of the paper roll.

System Batching

In another aspect of the present invention the film rolls may be batched so as to increase productivity of the overall system. For example, system batching can be provided so as to maximize the efficiency of any printer, processor, finishing station or any other device within the photofinishing system. By properly keeping track of the orders, for example, by CID, FID, customer order, or any other parameters that are being processed throughout the system, appropriate batching of orders can be provided along the system so that any one device is not too backed up while another individual piece of equipment remains idle or is running at reduced capacity. The present invention allows batching of individual rolls to accommodate and more efficiently utilize the various pieces of photofinishing equipment in the system. The printer output may be directed to one or more different finishing stations in accordance with the backlog present at the finishing station. Additionally, the amount of film sent to any particular printer, processor, or any other device may be controlled in a similar manner so that each piece of equipment is best utilized. Thus, the present invention allows sorting of the rolls of film in various batch sizes which correspond to requirements of the individual pieces of equipment so that the overall system efficiency is maintained.

While the invention has been described with reference to a preferred embodiment, it will be understood by those skilled in the art that the invention is not limited to the particular details of the embodiment illustrated. The claims are intended to cover all such modifications and applications that do not depart from the true spirit and scope of the invention.

PARTS LIST FOR FIGURES

10—order entry station.
12—film development station.
14—machine sorting station.
16—printing station.
18—paper development station.
20—finishing station.
22—information processing and control network.
24—film bag or bin.
26—film rolls.
28—envelopes.
30—reader.
32—envelope reader.
34—terminal.
36—tote.
38—tote
40—hopper.
42—film roll and cartridge.
44—film roll and cartridge.
46—tank.
48—tank.
50—tank.
52—hopper.
54—sorter section.
56—bin.
58—bin.
60—bin.

62—bin.
64—film loading magazine.
66—film batching magazine.
70—rotary support.
72—arm.
74—spider—turret.
76—reciprocatable arm.
78—reciprocatable arm.
80—reciprocatable arm.
82—reciprocatable arm.
84—loading station.
86—scanning station.
88—printing station.
90—unloading station.
92—light source.
94—lamp house.
96—rotation mount.
98—arm.
100—paper supply roll.
102—paper supply magazine.
104—paper take—up roll.
106—paper take—up magazine.
108—exposure section.
110—CRT.
112—tank.
114—tank.
116—drying chamber.
118—print roll.
120—inspection table.
122—print roll.
124—print cutting station.
126—envelope supply.
130—production management computer.
210—Envelope.
220—Envelope opened.
222—Film cartridge.
224—Film detaching and splicing station.
232—Stepper motor.
234—Accessible portion.
236—Cartridge spool.
237—Film strip.
238—Film drive.
240—Sensing device.
242—Control.
244—Film notch.
246—Aperture.
248—Aperture.
250—Hook.
252—Slot.
254—Semi—circular section.
256—Semi—circular section.
258—Extension.
260—Flexible tool.
262—Film conduit.
264—Rounded end section.
266—Rounded end section.
268—Center section.
270—Ramped side.
272—Cine film processor.
274—Desplicing and reattaching station.
300—Desplicing apparatus.
310—Splice.
312—Film strip.
314—Film strip
316—Heating head.
318—Platen.
322—First drive.
324—Second drive.
326—Pick-up web.
328—Thermal adhesive.
330—Space.
332—Heating shoe.
334—Hot plate.
342—Pressure rod.
344—Air supply.
346—Sensor.
348—Sensor.
350—Sensor.
352—Drive.
355—Reattaching apparatus.
356—Slot.
357—Reattaching tool.
358—Tool features.
359—Finger.
360—Finger.
362—Finger.
364—Projection.
366—Drive shaft.

What is claimed is:

1. A process for developing and printing photographic film in high volumes, including a film developing step, followed by a film printing step, followed by an inspection step, is characterized by:

developing said film in said developing step in a first batch;

printing said film in said film printing step in a second batch different from said first batch, wherein said first batch is defined by a random ordering of filmstrips, and said second batch is defined by a second ordering of said film strips different from said random ordering; and inspecting said film.

2. The process according to claim 1, wherein said printing includes the steps of exposing photographic paper and developing said paper, and wherein said film is maintained in said second batch throughout said paper exposing and developing steps.

3. The process of claim 1, wherein said first batch is defined by film strips in a first sequential order and said second batch is defined by film strips in a different sequential order.

4. The process of claim 1, including the steps of:

splicing a plurality of film strips together to form said first batch before said developing step;

desplicing said plurality of film strips to separate said film strips after said developing step;

printing the despliced film strips; and establishing said second batch based on the order in which said despliced film strips are printed.

5. The process according to claim 4, wherein said printing includes the steps of exposing photographic paper and developing said paper, and wherein said film is maintained in said second batch throughout said paper developing.

6. A process for developing and printing in high volumes, individual customer rolls of photographic film, is characterized by:

developing said film one-roll-after-another in a first order; then printing said film one-roll-after-another in a second order different from said first order; and then inspecting said film after said developing and said printing steps, wherein said developing and printing steps precede said inspecting step.

7. The process according to claim 6, wherein said printing includes the steps of exposing photographic paper and developing said paper, and wherein said film rolls are maintained in said second order throughout said paper developing.

8. A process for developing and printing customer rolls of photographic film each including a unique identification number; is characterized by:

entering said unique identification numbers in a system for tracking the film rolls throughout the developing and printing process;

entering information about the printing of said film rolls in said system in association with said unique identification numbers;

developing said film rolls one-roll-after-another in a first order;

printing said film rolls one-roll-after-another in a second order different from said first order;

using said unique identification numbers and said information associated therewith for printing in said second order; and inspecting said film after said developing and said printing steps, to determine if any make-over operations of said printed film may be required as a result of said inspection step.

9. The process according to claim 8, for interspersing original orders with reorders, and wherein said information identifies images on the film rolls for printing reorders.

10. The process according to claim 8, wherein said information is entered for each film roll in two steps, one before film development and one after film development.

11. The process according to claim 10, including the step of establishing a batch of film rolls after film development based on said information.

* * * * *